Patented May 29, 1928.

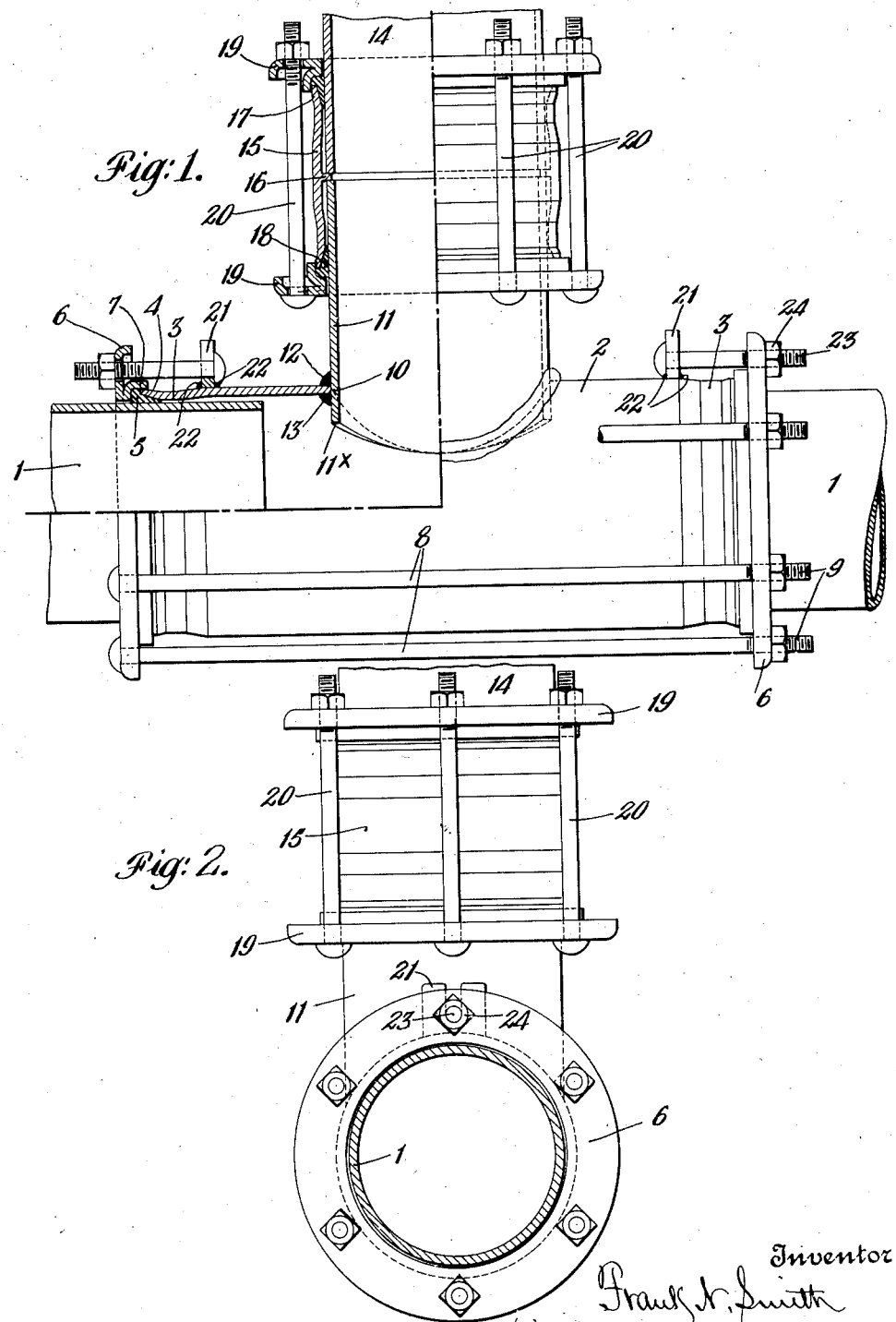

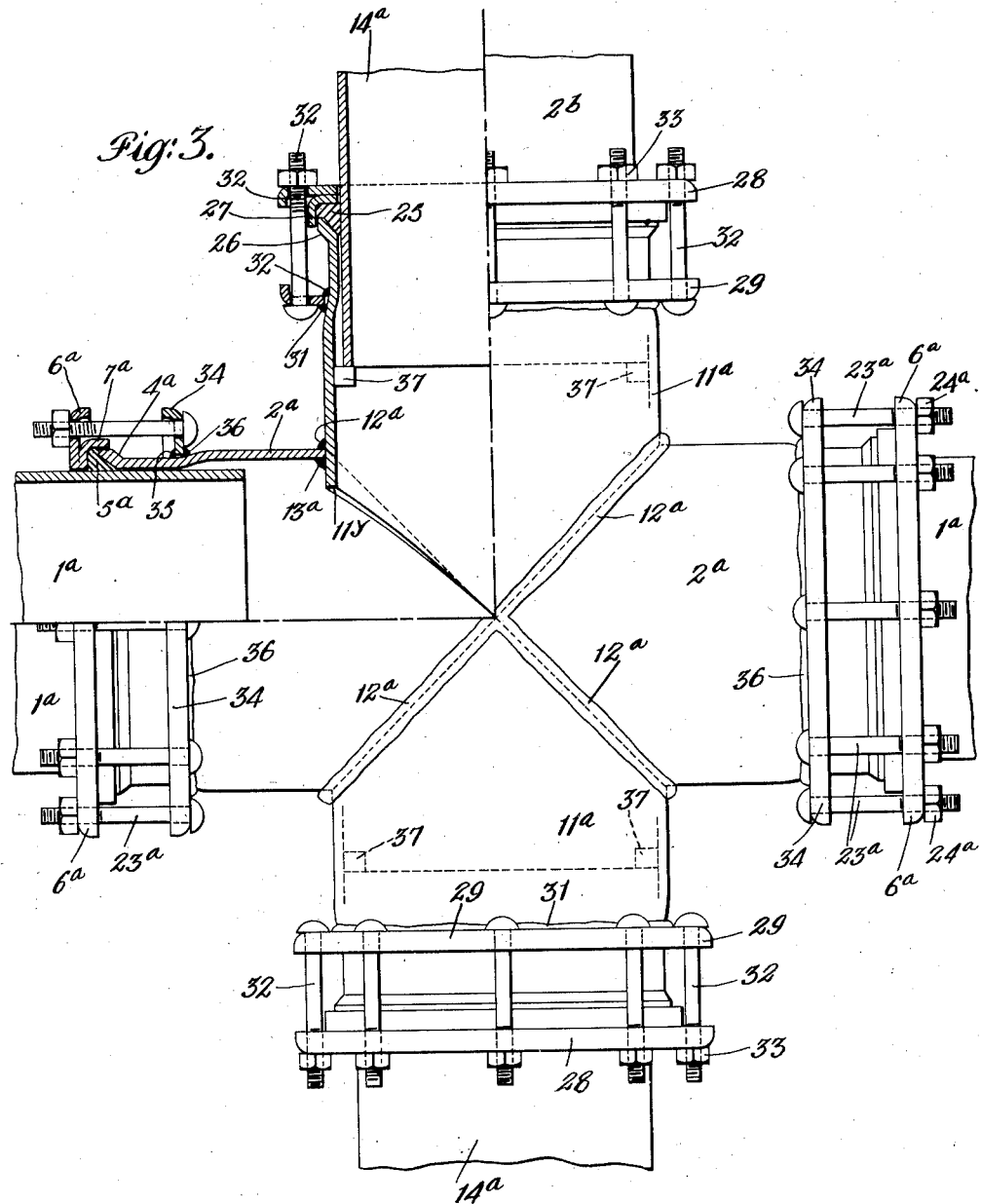

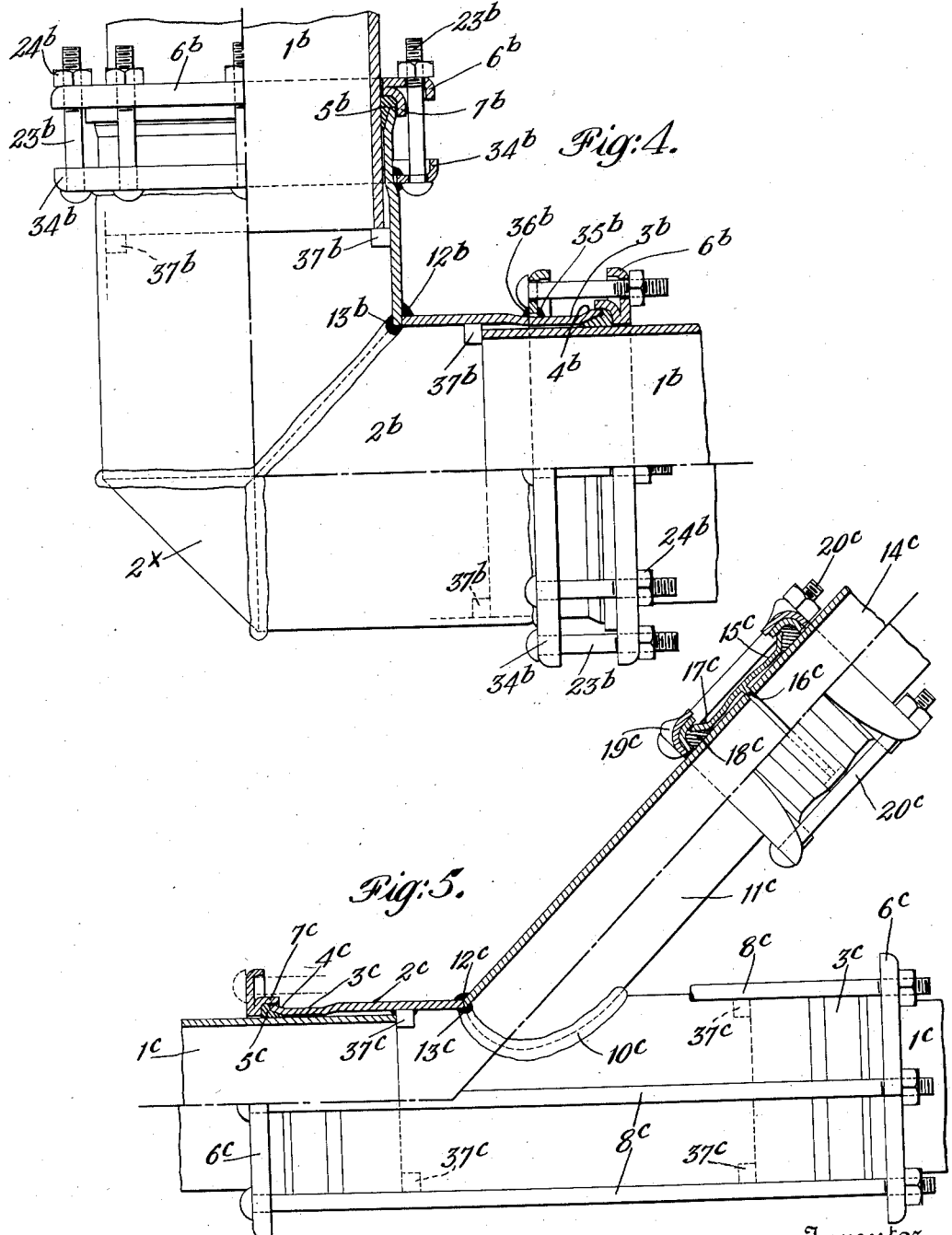

1,671,789

UNITED STATES PATENT OFFICE.

FRANK N. SMITH, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

WROUGHT-METAL CONNECTION FOR PLAIN-END PIPE SECTIONS.

Application filed March 4, 1924. Serial No. 696,815.

My invention consists in the novel features hereinafter described, reference being had to the accompanying drawings which show several forms in which I have contemplated embodying the invention, selected by me for purposes of illustration and the said invention is fully disclosed in the following description and claims.

The object of my invention is to provide a wrought metal pipe fitting for angularly disposed plain end pipe sections, such as are used in pipe lines for conveying natural gas and other fluids, especially in long pipe lines extending across the country, sometimes for many hundreds of miles. These pipe sections consist of cylindrical pieces of wrought metal pipe, usually of iron or steel, the end portions having a plain cylindrical exterior, without screw threads. These pipe sections are ordinarily connected in the line by what is known as a rubber packed pipe coupling, such as is illustrated, for example, in United States Letters Patent to Solomon R. Dresser, #884,371, dated April 14, 1908. These couplings are extremely advantageous for connecting plain end or unthreaded pipes when laid in a pipe line in substantially axial relation and they consist essentially of a middle ring or coupling sleeve, provided with an interior centering stop and a packing recess at either end, packing rings for engaging the packing recess and the exterior of the pipe sections to be connected, clamping rings for engaging the packing rings and compressing them, and bolts engaging the clamping rings for compressing the packing rings. These rubber packed pipe couplings permit a certain amount of endwise movement of the connected pipes to accommodate changes in temperature, and also slight variations from the axial relation of the connected pipe sections, which enables them to be laid over hills and down through valleys, and also permits a very gradual deviation of the pipe line from a straight line where this may be necessary or desirable. In the laying of pipe lines of this character it is frequently necessary to connect plain end pipe sections which are disposed at an angle to each other, as in connecting a branch line with the main line, for example, which branch line may extend at right angles or any other angle to the main line, and also where it is necessary to connect the pipes of a main line or branch line disposed at right angles or any other angular relation with each other greater than would be possible to accommodate with the ordinary rubber packed pipe coupling and necessitating some form of angular connection or elbow coupling for the purpose.

In the accompanying drawings,

Fig. 1 represents an elevation, partly in section of a wrought metal pipe fitting for connecting plain end, adjacent pipe sections of a pipe line with a branch line extending at any desired angle to the main line, said fitting being provided with a branch of substantially the same exterior and interior diameters as the plain end pipe sections of the branch line.

Fig. 2 represents an end elevation of the fitting illustrated in Fig. 1.

Fig. 3 is a view similar to Fig. 1 illustrating a modification of my invention, in which the wrought metal fitting is provided with two oppositely arranged branches of greater internal diameter than the external diameter of the plain end pipe sections of the branch lines, to which they are connected.

Fig. 4 is an elevation, partly in section, showing a modified form of my improved wrought metal fitting arranged for the connection of adjacent pipe sections in either a main or branch line which are disposed at a considerable angle to each other.

Fig. 5 is a view similar to Fig. 1, illustrating a slightly modified form of my wrought metal fitting for connecting a branch line to a main line, the branch pipe being shown as of the same size as the adjacent plain end pipes of the branch line, and having its axis disposed at an angle of substantially 45° to the axis of the coupling sleeve, for connecting the main line sections.

Referring to Figs. 1 and 2, 1—1, represent plain end pipe sections forming part of a main line and disposed in substantially axial line with each other, which it is desired to connect together and to a branch line disposed in this instance substantially at right angles to the axes of the main line pipe sections. 2 represents an elongated coupling sleeve of wrought metal having an internal diameter preferably somewhat greater than the external diameter of the pipe sections, 1—1, to be connected, and provided adjacent to each end with what I term a pipe engaging portion, 3, of reduced diameter, the internal diameter of which reduced portion substantially fits the exterior of the adjacent pipe section, leaving only sufficient clearance to accommodate variations in the exterior surface of the pipe section. The sleeve, 2, is provided at each end with an outwardly extending packing engaging flange, 4, forming an annular conical packing recess within the same, and between it and the exterior surface of the pipe. 5—5 represents compressible packing rings adapted to surround the adjacent pipe sections and provided with conical portions to fit said packing recesses, said packing rings having enlarged exterior portions outside of the packing recess to fit within a packing recess formed in a wrought metal clamping ring with which each end of the sleeve, 2, is provided. Each of these clamping rings consist of an annular plate portion, 6, and an annular flange portion, 7, to engage the exterior portion of the adjacent packing ring. The plate portion of each packing ring is provided with a circular series of bolt holes for the reception of clamping bolts, 8, provided with nuts, 9, for compressing the packing rings between the flanges, 4, and the exterior of the adjacent pipe section, so as to make a perfectly tight joint. In this instance the sleeve, 2, is provided at one side and about centrally between its ends with an aperture, indicated at 10, to receive and fit a branch pipe, 11, of wrought metal, which is inserted into said aperture and extends within the sleeve, 2, far enough to serve as a stop 11ˣ, to prevent pipe sections, 1, from being inserted in the sleeve from either end beyond the adjacent wall of the branch pipe, 11, as clearly indicated in Fig. 1. The branch pipe is welded in the aperture, 10, of the sleeve, 2, and I prefer to perform the welding operation on an electric welding machine and with a welding rod, to form fillets, indicated at 12 and 13, respectively on the exterior and interior of the sleeve, 2, following the edge of the aperture, 10, and uniting said edge to the exterior of the branch pipe, 11, thereby making a tight joint and rigidly connecting the sleeve, 2, and branch pipe, 11. In Fig. 1 I have shown the branch pipe, 11, as being of the same internal and external diameters as the adjacent pipe section, 14, of the branch line, to which the branch, 11, is to be connected, and in such case the branch, 11, may be connected to the adjacent branch pipe section, 14, by means of one of the well known rubber packed pipe couplings before referred to. Such a coupling is illustrated in Fig. 1, and comprises the middle ring or sleeve, 15, having a centering stop, 16, and packing engaging flanges, 17, and packing rings, 18, clamping plates, 19, and connecting bolts, 20, constructed and operating substantially as described in the Dresser patent hereinbefore referred to. This coupling, per se, forms no part of my present invention and will not be more particularly described or claimed herein.

For the purpose of compressing the packing rings, 5, of the sleeve, 2, I may employ what I term "through-bolts" extending from one clamping ring to the other and being of greater length than the sleeve, 2, or I may employ short bolts extending from each clamping ring to anchoring devices provided on the exterior of the sleeve adjacent to each end of the same, as hereinafter more particularly described. In the form of my invention illustrated in Figs. 1 and 2 I have shown a series of through-bolts, indicated at 8, for directly connecting the two flanges, 6. Where, however, certain of the bolt holes are in line with the branch pipe, 11, it is obviously not possible to employ a through-bolt, and in such case I provide wrought metal anchor lugs, indicated at 21, on the exterior of the sleeve, 2, welded to the sleeve, preferably by means of the electric welding machine and a welding rod, and the formation of fillets, 22, as shown, which anchor lugs are connected to the adjacent clamping ring by means of short bolts, 23, and nuts, 24. It will be understood that the fitting illustrated in Figs. 1 and 2 will form a positive and tight connection between the axially aligned plain end pipe sections, 1—1, of the main line and the plain end pipe section, 14, of the branch line, and will at the same time permit of longitudinal movements of the main line pipe sections and branch line pipe section with respect to the fitting which may be caused by variations of temperature, and will also permit slight variations or deviations from the axial position of the main line pipe sections, 1—1, with respect to each other and of the adjacent branch line pipe section, 14, with respect to the branch pipe, 11, without interfering with the tightness and general reliability of the joints.

Referring to Fig. 3, which illustrates a slight modification of my invention, 1ᵃ—1ᵃ, represent two plain end pipe sections of the main line to be connected, in this case with two branch lines, the adjacent pipe sections of which are indicated at 14ᵃ—14ᵃ, so that the fitting is in the form of a cross. In such case the sleeve may be formed in the manner shown in Fig. 1, and provided with two branch pipes instead of one, disposed oppositely to each other and welded in suitable apertures formed in the sleeve, in the manner clearly shown in Fig. 1 and hereinbefore described. I prefer, however, where two branch pipes are to be inserted, to form the wrought metal sleeve, here indicated at 2ᵃ, of two separately formed sections, suitably mitred to receive and engage mitred portions of the wrought metal branches, 11ª—11ª, the several sections, 2ª, and 11ª, being united by welding, and preferably on the electric welding machine, by the use of a welding rod and the formation of fillets, 12ª—13ª, on the exterior and interior respectively of the sleeve sections, 2ª, as indicated in Fig. 3. I prefer to have portions of the inner ends of the branch pipes, 11ª, extend inwardly, as indicated at 11ʸ, far enough into the adjacent sleeve section to form stops to prevent the adjacent main line pipe sections, 1ª, from being inserted into the sleeve beyond the nearest walls of the branch pipes or branches, 11ª.

It will be understood that the branch pipes may be of the same internal and external diameters, as the adjacent pipe sections of the branch line, as indicated in Fig. 1 or as indicated in Fig. 3, they may be of greater internal diameter than the external diameter of the adjacent branch pipe section, in this case, 14ª. Where this construction is employed, each branch pipe will be provided adjacent to its outer end with a pipe engaging portion, 25, to substantially fit the adjacent branch pipe section, 14ª, leaving only sufficient clearance to accommodate inequalities in the exterior surface of the pipe section and the outer end of the branch will be provided with a packing engaging flange, 26, an annular packing ring, 27, and wrought metal clamping ring, 28, similar to the packing rings and clamping rings hereinbefore described. I prefer to provide each of the branch pipes with a wrought metal anchor ring, 29, welded to the branch pipe, preferably by means of the electric welding machine and welding rod, and the formation of fillets, 30—31, and to connect the anchor ring with the clamping ring, 28, by means of short bolts, 32, and nuts, 33, as shown in Fig. 3. In this instance the outer ends of the sleeve sections, 2ª, are each provided with a reduced portion 3ª and the packing engaging flange, 4ª, annular packing ring, 5ª, wrought metal clamping ring, 6ª, with packing engaging flange, 7ª, constructed substantially like the corresponding parts illustrated in Fig. 1. In this instance each of the sleeve sections, 2ª, is provided with an anchor ring, 34, welded to the respective sleeve sections, preferably by the electric welding machine and welding rod, and the formation of fillets, 35—36. The anchor rings, 34, are each connected to the adjacent clamping rings, 6ª, by short bolts, 23ª, and nuts, 24ª.

I wish it to be understood that in the form of my invention illustrated in Figs. 1 and 2, I may, if preferred, dispense with the use of through-bolts and provide the sleeve with anchor flanges, like those shown in Fig. 3, and connect each of these anchor flanges directly with the adjacent clamping ring by means of short bolts, if desired. I also wish it to be understood that where my improved fittings are provided with one or more branches, such branches may be made either of the same internal and external diameters, as the adjacent branch pipe section, as indicated in Fig. 1, or in the form illustrated in Fig. 3, as preferred. Where I employ the form of branch having its internal diameter greater than the external diameter of the adjacent pipe section, it is desirable to provide suitable stops to prevent the adjacent branch pipe, 14ª (or 14) from being inserted too far into the branch. I have shown in Fig. 3 one or more (preferably two) stops, 37, welded to the interior of the branch pipe, 11ª, and preferably by means of the electric welding machine and welding rod, and the formation of fillets connecting said stops with the interior face of the branch, these stops projecting inward far enough so that they may be engaged by the end of the adjacent branch pipe section to limit the extent to which the branch pipe section, 14ª, can be inserted into the branch, 11ª. I also wish it to be understood that in constructing the fitting illustrated in Fig. 3, I may dispense with one of the branches, if desirable, the adjacent sections, 2ª, of the sleeve being correspondingly formed and mitred to accommodate one of the branches, 11ª.

In Fig. 4 I have illustrated another slight modification of my invention, in which the sleeve portion is constructed so as to connect the main line (or branch line) plain end pipe sections, disposed at an angle to each other, instead of being in substantially axial relation. In this figure, 2ᵇ—2ᵇ, represent wrought metal sleeve sections having their inner ends cut and mitred so as to meet each other, and the edges of a third section, illustrated at 2ˣ, the three sections, 2ᵇ—2ᵇ—2ˣ, being welded, preferably on the electric welding machine by the aid of a welding rod and the formation of fillets, 12ᵇ and 13ᵇ, on the exterior and interior faces of the sleeve, and uniting the meeting edges of the parts in the manner shown, so as to form an angular sleeve or elbow. The inner portion of each of the sleeve sections, 2ᵇ, is of greater internal diameter than the external diameter of the pipe section, 1ᵇ, to be inserted therein, and each of said sections is provided adjacent to its outer end with a pipe engaging portion, 3ᵇ, of reduced internal diameter to substantially fit the plain end pipe section, with the usual clearance, and at its outer end each sleeve section, 2ᵇ, is provided with the packing engaging flange, 4ᵇ, to engage the packing ring, 5ᵇ, which is in turn engaged by the clamping ring, 6ᵇ, provided with the flange member, 7ᵇ, surrounding the outer portions of the packing ring. Each of the pipe sections, 2ᵇ, is provided with an anchor ring, 34ᵇ, welded to the exterior of the sleeve section, preferably by means of an electric welding machine and welding rod, and the formation of annular fillets, 35ᵇ—36ᵇ, which secure the anchor flange to the sleeve section, preferably adjacent to the inner end of the reduced portion, 3ᵇ. Each of the sleeve sections, 2ᵇ, is also provided internally with one or more (preferably two) oppositely disposed stops or projections, 37ᵇ, welded to the interior surface of the enlarged portion of each of said sections, 2ᵇ, preferably by means of the electric welding machine and welding rod, forming fillets on opposite sides of the stop, securing them to the adjacent face of the sleeve section, 2ᵇ. These stops perform two functions. They prevent the pipe sections 1ᵇ from being pushed too far, or further than necessary, into the sleeve section, 2ᵇ, while at the same time they afford a guide to the workmen employed in connecting the pipe sections, so that they may know by the engagement of the pipe sections, 1ᵇ, with said stops, that they have inserted the pipe sections far enough within the sleeve members so that they will not be likely to be withdrawn from engagement with the packing rings by the contraction of the pipe sections, and sleeve members, due to changes of temperature. It will be noted that by means of the fitting shown in Fig. 4, two plain end pipe sections, 1ᵇ, disposed at an angle to each other, can be readily connected and when the parts are assembled as shown in this figure, the joint can be made perfectly tight by connecting the anchor rings with the adjacent clamping rings by means of short bolts, 23ᵇ and nuts 24ᵇ, thereby compressing the packing rings between the flanges, 4ᵇ and 7ᵇ, and the exterior of the plain end pipe sections. It will be understood that, while the construction shown in Fig. 4 will connect pipe sections having their axes extending at right angles to each other, the mitred faces of the sleeve sections, 2ᵇ—2ᵇ—2ˣ, may be so constructed as to enable the fitting to connect two pipe sections having their axes disposed at any desired angle and without altering the other parts of the fitting illustrated in Fig. 4.

In Fig. 5 I have illustrated another modification of my improved fitting for connecting two plain end, wrought metal pipe sections, 1ᶜ—1ᶜ, having their axes in substantial alignment and at the same time providing means for attaching the pipe sections of a branch line extending angularly therefrom. In this figure, 2ᶜ, represents the wrought metal coupling sleeve, which is provided with a central portion of enlarged diameter having its internal diameter greater than the external diameter of the pipe sections to be connected in aligned relation therewith, and provided adjacent to each end with a reduced pipe engaging portion, 3ᶜ, and at each end with packing engaging flanges, 4ᶜ, to engage packing rings, 5ᶜ, which are engaged by the flange members, 7ᶜ, of the clamping rings, 6ᶜ, in substantially the same manner as illustrated in Fig. 1. In this instance the sleeve, 2ᶜ, is provided at one side with an aperture, 10ᶜ, to receive the branch pipe, 11ᶜ, the inner end portions of which are cut away so as to substantially fit against the edges of the aperture, 10ᶜ, in the sleeve, the meeting edges of the sleeve aperture and branch pipe being beveled so as to come together with a flush joint. The branch pipe, 11ᶜ, is united to the sleeve, 2ᶜ, by welding and preferably by the use of an electric welding machine and welding rod, from which is formed fillets, 12ᶜ—13ᶜ, overlapping the meeting edges of the sleeve aperture and branch pipe and welded to the sleeve and branch, thereby uniting the branch and sleeve and forming a gas tight joint between them. In Fig. 5 the branch pipe, 11ᶜ, is shown as being of smaller diameter than the pipe sections, 1ᶜ, and as being of the same internal and external diameter as the adjacent pipe sections, 14ᶜ, of the branch pipe line. In such case the branch pipe, 11ᶜ, and the adjacent pipe line section, 14ᶜ, both of which have plain ends, may be conveniently united by an ordinary pipe coupling in a manner similar to that shown in Fig. 1, the pipe coupling, however, being of a smaller size than those used in connecting the pipe sections, 1ᶜ, of the main line. As shown in Fig. 5, the pipe coupling comprises the middle ring, 15ᶜ, provided with a centering stop, 16ᶜ, and packing engaging flanges, 17ᶜ, packing rings, 18ᶜ, and clamping rings, 19ᶜ, connected by clamping bolts, 20ᶜ, in the usual manner, and thus forming a tight joint between the branch, 11ᶜ, and the adjacent pipe section, 14ᶜ, of the branch line. The clamping rings, 6ᶜ, of the sleeve, 2ᶜ, may be connected by through-bolts, as in Fig. 1, or the sleeve, 2ᶜ, may be provided with anchor flanges connected by the short bolts, to the adjacent clamping ring, as in Fig. 3. In this particular instance I have shown the clamping rings, 6ᶜ, directly connected by through-bolts, 8ᶜ, and the bolts so disposed in the bolt circle that the through bolts will pass on opposite sides of the branch pipe, 11ᶜ. If this were not convenient or desirable, and it becomes necessary to have one or more bolts for the sleeve in direct line with the branch line, the sleeve will be provided with the necessary anchor lugs and short bolts at these points, as indicated in Fig. 1, but this will not be necessary where the branch pipe is considerably smaller in diameter than the sleeve, and in the smaller size of these fittings. The sleeve, 2ᶜ, is also provided adjacent to each end with one or more stops, 37ᶜ, (preferably two disposed oppositely), welded to the interior of the enlarged portion of the sleeve, 2ᶜ, to limit the extent to which the plain pipe sections, 1ᶜ, can be inserted into the sleeve, and to serve as a guide to insure that the pipe sections shall be inserted far enough, while preventing them from being inserted too far so as to partially close the branch aperture, 10ᶜ.

It will be understood that my improved fitting can be readily made by slightly modifying the shapes of the described parts so as to serve for the connection of plain end pipe sections disposed at any desired angle to each other and for the connection of a branch pipe line, or lines, to a main line at any desired angle to the axis of the main line. These fittings being composed entirely of wrought metal, are much lighter than cast metal fittings, and are therefore much easier to handle and transport. These fittings are also fluid tight and are entirely free from the porosities, sand holes, and other defects characteristic of cast iron constructions, while the angularly disposed portions being welded together, are as strong or stronger at the joints than at the other portions thereof, so that these fittings can be manufactured at very reasonable expense, and can be readily adapted to meet the various exigencies which arise in the laying of a pipe line, and the connection of a branch line or lines thereto.

What I claim and desire to secure by Letters Patent is:—

1. In a wrought metal fitting for angularly disposed plain end pipes, the combination with a one piece cylindrical sleeve member provided at at least one end with an integral outwardly flared packing engaging flange for forming a packing recess between it and the plain end of an adjacent pipe section, a compressible packing for said recess, a clamping ring for engaging said packing, and means for connecting said clamping ring with the cylindrical sleeve member, of a separately formed cylindrical branch member having its axis disposed angularly to the axis of said sleeve member, welded to said sleeve member and communicating interiorly therewith, said branch member being provided with means including compressible packing and clamping means therefor, for connecting a plain end pipe coupling to said branch member.

2. In a wrought metal fitting for angularly disposed pipes, the combination with a one piece cylindrical sleeve member provided adjacent to each end with a portion of reduced diameter to receive a plain end pipe section, the portions of said sleeve between the reduced portions being of greater diameter, said sleeve having at each end integral outwardly flared marginal portions forming a packing recess between it and the adjacent pipe section, compressible packings for said recess, clamping rings and clamping bolts for compressing said packings, of a separately formed cylindrical branch member having its axis disposed angularly to that of said sleeve member, and communicating therewith, and electrically welded thereto, the outer end of said branch member being provided with coupling means including compressible packing, clamping ring, and clamping bolts therefor for coupling a plain end pipe section thereto.

3. In a wrought metal fitting for angularly disposed pipes, the combination with a one piece cylindrical sleeve member provided adjacent to each end with a portion of reduced diameter to receive a plain end pipe section, the portions of said sleeve between the reduced portions being of greater diameter, said sleeve having at each end integral outwardly flared marginal portions forming a packing recess between it and the adjacent pipe section, compressible packings for said recess, clamping rings and clamping bolts for compressing said packings, of a separately formed cylindrical branch member having its axis disposed angularly to that of said sleeve member, and communicating therewith, and electrically welded thereto, the outer end of said branch member being provided with coupling means including compressible packing, clamping ring, and clamping bolts therefor for coupling a plain end pipe section thereto, the inner end of said branch pipe projecting inwardly into said sleeve, and being interposed between the ends of the pipe sections connected thereby, and serving as a stop to limit the inward movement of said pipe sections in assembling the fitting in connection therewith.

4. In a wrought metal fitting for angularly disposed pipes, the combination with a one piece cylindrical sleeve member provided adjacent to each end with a portion of reduced diameter to receive a plain end pipe section, the portions of said sleeve between the reduced portions being of greater diameter, said sleeve having at each end integral outwardly flared marginal portions forming a packing recess between it and the adjacent pipe section, compressible packings for said recess, clamping rings and clamping bolts for compressing said packings, of a separately formed cylindrical branch member having its axis disposed angularly to that of said sleeve member, and communicating therewith, and electrically welded thereto, the outer end of said branch member being provided with coupling means including compressible packing, clamping ring, and clamping bolts therefor for coupling a plain end pipe section thereto, the inner end of said branch pipe projecting inwardly into said sleeve, and being interposed between the ends of the pipe sections connected thereby, movement of said pipe sections in assembling the fitting in connection therewith, and said branch pipe having substantially the same internal and external diameters as the pipe section to which it is connected.

5. In a wrought metal fitting for angularly disposed pipes, the combination with a one piece cylindrical sleeve member provided adjacent to each end with a portion of reduced diameter to receive a plain end pipe section, the portions of said sleeve between the reduced portions being of greater diameter, said sleeve having at each end integral outwardly flared marginal portions forming a packing recess between it and the adjacent pipe section, compressible packings for said recess, clamping rings and clamping bolts for compressing said packings, of a separately formed cylindrical branch member having its axis disposed angularly to that of said sleeve member, and communicating therewith, and electrically welded thereto, the outer end of said branch member being provided with coupling means including compressible packing, clamping ring, and clamping bolts therefor for coupling a plain end pipe section thereto, the inner end of said branch pipe projecting inwardly into said sleeve, and being interposed between the ends of the pipe sections connected thereby, and serving as a stop to limit the inward movement of said pipe sections in assembling the fitting in connection therewith, said sleeve being provided with anchoring devices formed separately and welded thereto, adjacent to its ends for engaging clamping bolts.

6. In a wrought metal fitting for angularly disposed pipes, the combination with a one piece cylindrical sleeve member provided adjacent to each end with a portion or reduced diameter to receive a plain end pipe section, the portions of said sleeve between the reduced portions being of greater diameter, said sleeves having at each end integral outwardly flared marginal portions forming a packing recess between it and the adjacent pipe section, compressible packings for said recess, clamping rings and clamping bolts for compressing said packings, of a separately formed cylindrical branch member having its axis disposed angularly to that of said sleeve member, and communicating therewith, and electrically welded thereto, the outer end of said branch member being provided with coupling means including compressible packing, clamping ring, and clamping bolts therefor for coupling a plain end pipe section thereto, the inner end of said branch pipe projecting inwardly into said sleeve, and being interposed between the ends of the pipe sections connected thereby, and serving as a stop to limit the inward movement of said pipe sections in assembling the fitting in connection therewith, certain of the clamping bolts for the sleeve extending from one clamping ring to the other, said sleeve being provided on the side adjacent to said branch member with separately formed anchoring devices welded to said sleeve, the clamping bolts of the sleeve in alignment with said branch member being connected to said anchoring devices and to the adjacent flange member.

7. In a wrought metal fitting for angularly disposed pipes, the combination with a one piece cylindrical sleeve member having its central portion of greater diameter than the pipes to be connected, and provided at each end with a reduced portion adapted to fit around a plain end pipe section, and having its marginal portions flared outwardly to form packing recesses, annular compressible packings engaging said recesses, clamping rings for said packings, and clamping bolts, said sleeve being provided with a lateral aperture, of a cylindrical branch member projecting through said aperture communicating with the interior of the sleeve, and having its inner end portions projecting into said sleeve between the ends of the pipe sections connected thereby, so as to serve as stops to limit said pipe sections in assembling, said branch member having its axis disposed angularly to that of the sleeve, and being united thereto by electric welding and the formation of a fillet surrounding said branch member on the exterior and on the interior of said sleeve, said branch member being provided with means including annular compressible packing and clamping means therefor, for uniting it to a plain end pipe section.

In testimony whereof I affix my signature.

FRANK N. SMITH.